W. WATSON.
Turpentine Tools.
No. 151,551.
Patented June 2, 1874.
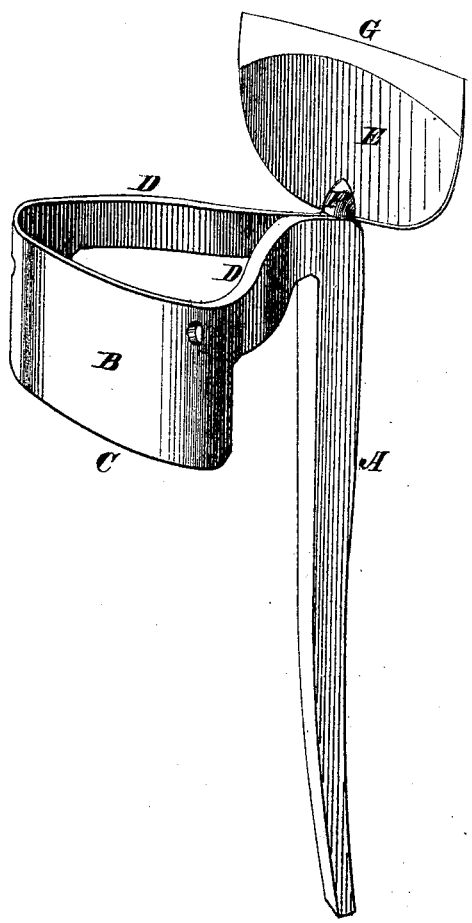
Witnesses:
T. McArdle
O. Sedgwick
Inventor:
W. Watson
Per Munn & Co
Attorneys

UNITED STATES PATENT OFFICE.

WALTER WATSON, OF FAYETTEVILLE, NORTH CAROLINA.

IMPROVEMENT IN TURPENTINE-TOOLS.

Specification forming part of Letters Patent No. 151,551, dated June 2, 1874; application filed October 11, 1873.

*To all whom it may concern:*

Be it known that I, WALTER WATSON, of Fayetteville, in the county of Cumberland and State of North Carolina, have invented a new and useful Improvement in Combined Turpentine-Tool, of which the following is a specification:

The object of this invention is to furnish a convenient tool for gathering turpentine from trees—one better adapted to the purpose than the tools now in use; and it consists in a tool having two blades, one for a scraping or down motion and one for pushing or upward motion, the construction being as hereinafter described.

The drawing illustrates my invention.

Similar letters of reference indicate corresponding parts.

A is the shank, by means of which the tool is connected to the handle. B is the scraper, consisting of a curved blade having a sharp under edge, C. This blade is connected with the butt of the shank by the strong arms D D, and projects out from the shank five inches, more or less. E is a blade, which is straight upon its sides and edge, with its sides parallel, or about parallel, with the shank A. This blade is attached, by means of a short shank or enlargement, F, to the end of the shank A. G is the sharp edge of this blade.

In gathering the turpentine it is important to have a tool which may be pulled down or pushed upward, for detaching the globules which ooze from the bark of the pine tree.

This tool is admirably adapted for such work, being, in fact, a pusher and scraper combined.

Having thus described my invention, I claim as new, and desire to secure by Letters Patent—

A turpentine-tool having shank A and blades B E, constructed and combined substantially as shown and described.

WALTER WATSON.

Witnesses:
   G. P. MCNEILL,
   W. T. TAYLOR.